Feb. 14, 1967   J. B. GILL   3,303,732
ADJUSTABLE PIPE MACHINING TOOL
Original Filed July 14, 1959   2 Sheets-Sheet 1
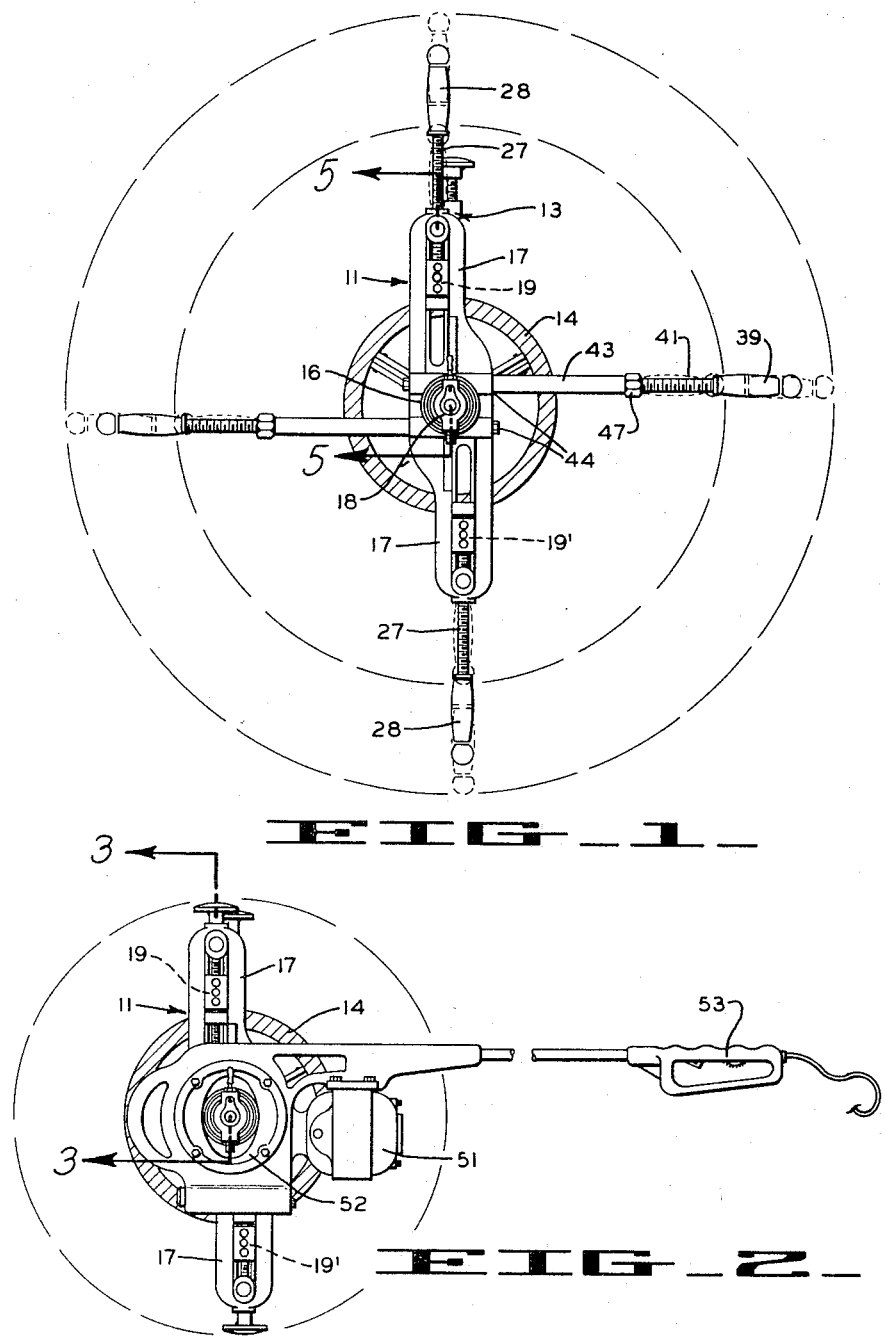
FIG_1_
FIG_2_
INVENTOR.
JOHN B. GILL
BY
Schapp & Hatch
ATTORNEY

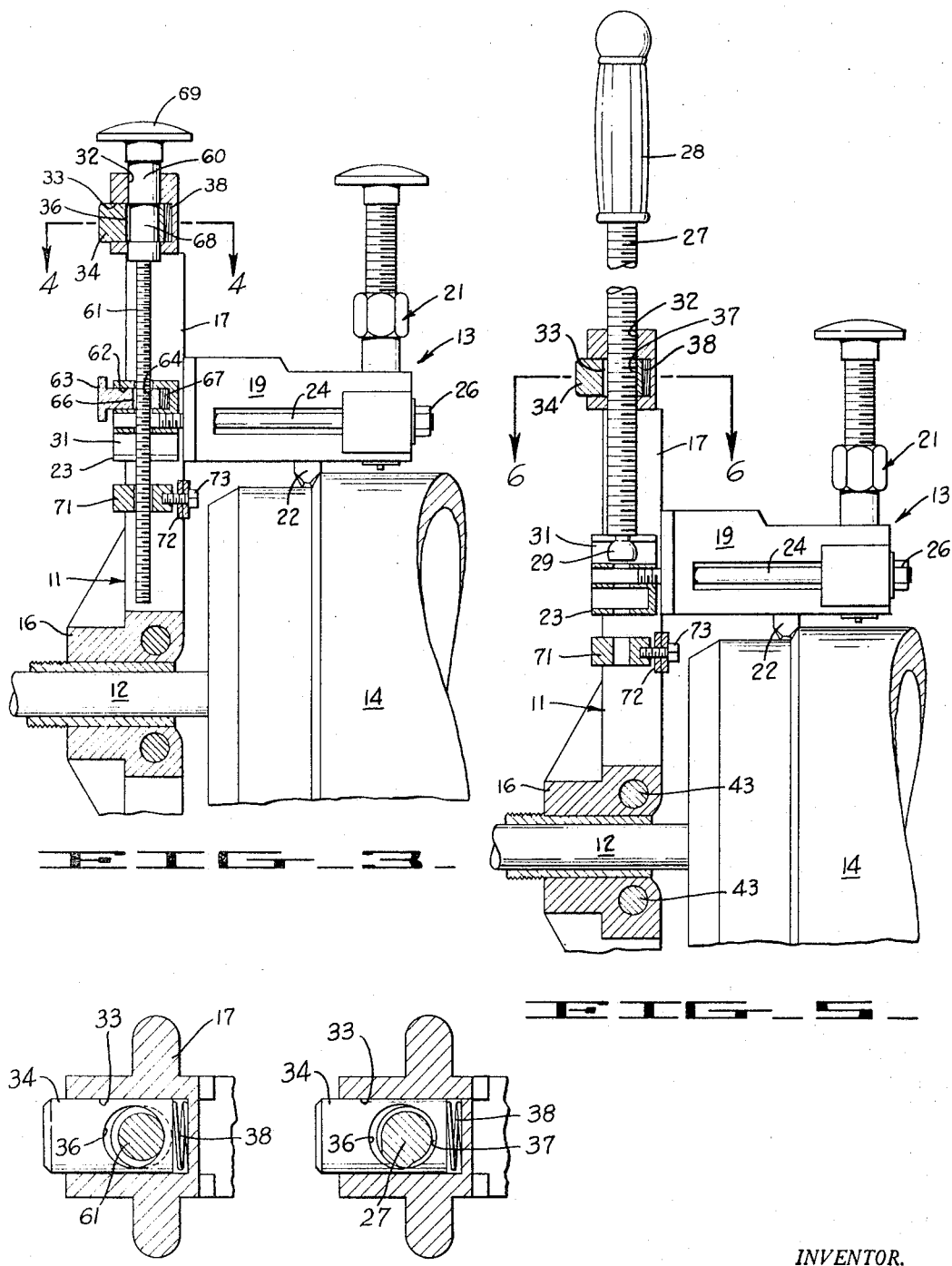

United States Patent Office 3,303,732
Patented Feb. 14, 1967

3,303,732
ADJUSTABLE PIPE MACHINING TOOL
John B. Gill, P.O. Box 2127, Torrance, Calif. 90503
Original application July 14, 1959, Ser. No. 827,043, now Patent No. 3,202,190, dated Aug. 24, 1965. Divided and this application July 12, 1965, Ser. No. 509,446
7 Claims. (Cl. 82—4)

This is a division of application Ser. No. 827,043, filed July 14, 1959, now issued as U.S. Patent No. 3,202,190.

This invention relates to improvements in an adjustable pipe machining tool, and more particularly to tools for machining a tapered or cylindrical finish to the end of an asbestos cement pipe.

A tool of this type is disclosed in my U.S. Patent No. 2,916,955, and entitled Pipe Machining Tool.

These tools consist basically of an arm, or pair of arms, mountable on an arbor shaft which is positioned in concentric relation in the end of a pipe to be machined. A screw feed is provided which advances the arms, and cutting tools carried thereon, toward the pipe when the arms are rotated around the arbor shaft.

In order to obtain the necessary precise adjustment of the cutting tools, they are moved along the radially extending arms by means of handles which are threaded in the arms. Radial adjustment of the cutting tools is effected by twisting the handles.

Where the machining tool is to be used with a much larger or smaller pipe than previously, adjustment of the cutting tools may require considerable time and effort in twisting the handles.

The present invention contemplates a quick release connection between the adjusting handles and the cutting tool which can be disegaged to allow the tool holder to be moved quickly to approximately the correct position. The connection may then be engaged to provide for fine screw adjustment to the precise position required.

The quick release connection is provided in two forms, for use with manually operated and motor driven pipe machining tools, with the parts being formed so that the same arbor and arm assembly may be employed in either type of operation.

It is, therefore, a principal object of the present invention to provide an adjustable tool for machining asbestos cement pipe in which the blade holders may be released quickly and easily from the screw adjustment means for repositioning on the arm, and in which the screw means may then be reconnected to provide for precise adjustment.

Another object of the invention is to provide an adjustable pipe machining tool having manually operable handles for adjusting the blades relative to the pipe to be machined, and for rotating the machining tool around the pipe; the handles being adapted to extend further outwardly when the blades are adjusted for the larger sizes of pipe, and with extendable auxiliary handles being provided in equally spaced circumferential increments.

A further object of the invention is the provision of a pipe machining tool of the character described in which the quick release connection is incorporated in the blade holder so as to adapt the machining tool for use with a non-extending screw adjustment handle suited to motor driven operation.

Additionally, it is proposed to provide a quick release connecting device in a machining tool arm which will accommodate both an extendable manually operable screw handle and a non-extendable screw adjusting handle, the device serving as a quick release screw connection with the extendable handle and as a keeper for the non-extendable handle.

A still further object of the invention is to provide a hub and arm assembly for a machining tool of the character described in which mounting means is provided in a form accommodating either a motor drive or auxiliary manually operable handles.

And finally, it is proposed to provide stop members which cooperate with the blade holders to insure return of the latter to a precise predetermined position after operation of the quick release connection.

Further objects and advantages of my invention will be apparent as the specification proceeds, and the new and useful features of my adjustable pipe maching tool will be fully defined in the claims attached hereto.

The preferred forms of my invention are illustrated in the accompanying drawings, forming part of this application, in which:

FIGURE 1 shows a front elevational view of a manually operable machining tool constructed in accordance with the present invention and mounted in operative position upon the end of an asbestos-cement pipe;

FIGURE 2, a front elevational view similar to that of FIGURE 1, but showing a motor driven adaptation of the machining tool;

FIGURE 3, a fragmentary, vertical sectional view on an enlarged scale, taken substantially on the line 3—3 of FIGURE 2;

FIGURE 4, a plan sectional view taken substantially on the plane of line 4—4 of FIGURE 3;

FIGURE 5, a fragmentary vertical sectional view on an enlarged scale taken substantially on the line 5—5 of FIGURE 1; and FIGURE 6, a plan sectional view taken substantially on the plane of line 6—6 of FIGURE 5.

While I have shown only the preferred forms of my invention, I wish to have it understood that various changes or modifications may be made within the scope of the claims hereto attached, without departing from the spirit of the invention.

Referring to the drawings in detail, the adjustable pipe machining tool of the present invention consists basically of a frame 11 carried for rotation on an arbor 12 and having a cutting blade means 13 adapted for machining cylindrical or tapered surfaces on the end of a pipe 14 as the frame is rotated on the arbor.

The frame 11 here consists of a hub section 16 to which is secured a pair of identical outwardly extending slotted arms 17 arranged at 180° spacing. A screw feed connection 18 is provided between the frame 11 and the arbor 12, this connection being effective to advance the frame toward the pipe 14 as it is rotated. Details of such a screw feed connection may be found in my aforementioned U.S. Patent No. 2,916,955.

The arbor may be of any suitable type which may be securely mounted in the end of the pipe to be machined and with the arbor shaft concentric with the pipe. An especially suitable arbor is disclosed and described in U.S. Patent No. 2,607,376.

The cutting blade means 13 consists essentially of a tool block 19 mounted for sliding movement along the slot in the arm 17 and adapted to support the required cutting blades. In this connection, it should be noted that any suitable blades may be carried on the block 19, the drawings showing a cut-off blade assembly 21 and a machining blade 22 attached to the tool block. Finishing and tapering blades (not shown) may be carried by the tool block 19' on the other side of the arms 17.

The tool blocks are here in two portions, the main block 19 and a clamping block 23 secured thereto by a longitudinal bolt 24. Blocks 19 and 23 are provided with confronting shoulders which slide along the opposite sides of arm 17 when a nut 26 is loosened on bolt 24, and the parts are proportioned so that the shoulders clamp down upon the arm 17 when the nut 26 is tightened. Such clamping insures that the tool block will stay in place once it is adjusted and during the actual machining of the pipe.

In accordance with the present invention, fine adjustment of the radial position of the tool block 19 is provided by a threaded rod 27, which terminates in a manually engageable handle 28. Rod 27 extends along arm 17 with the axis of the rod disposed so as to feed the blade assembly 21 radially with respect to the arbor 12. The inner end of the rod 27 is provided with a half-ball 29 engageable in a keyhole-shaped slot 31 formed in the bottom of the clamping block 23. This structure insures that the tool block will move inwardly and outwardly with the rod, while providing for the clamping movement of the block 23.

A threaded connection is provided between the end of arm 17 and the rod 27 so that twisting of the rod will move the rod and tool block in and out with respect to the pipe to be cut.

As a feature of the present invention, this connection is selectively releasable, so as to allow free radial movement of the blade assembly 21 carried by tool block 19, for gross adjustments, and may be quickly re-engaged for fine screw adjustments.

As may best be seen in FIGURES 5 and 6 of the drawings, the arm 17 is formed with a bore 32, adapted to receive and journal the rod 27, and an open chamber 33 intersecting the bore 32.

Mounted for axial reciprocation in the chamber 33 is a manually engageable quick release element 34, here in the form of a short brass rod. A bore 36 is formed through the element 34 in position for alignment with the bore 32 in arm 17.

Bore 36 is somewhat larger than the rod 27 (see FIGURE 6), and is provided with a threaded section 37 which is engageable with the threads on the rod to provide the threaded connection. When the element 34 is moved to disengage the threads, the rod is freely slidable through the bore 36.

Spring means is provided for yieldingly holding the element 34 in desired relation to the rod 27. For the purposes of the manually operable unit, it has been found desirable to bias the spring means so as to urge the threaded section 37 into engagement with the rod 27. The spring means is here provided in the form of a helical spring 38 mounted in the chamber 33 and compressed between the end of the element 34 and the end wall of the chamber.

Because the tool block 19 is attached to and moves with the inner end of the rod 27, it will be apparent that moving the tool block outwardly to accommodate a larger pipe will also move the handle 28 outwardly a like distance. This is advantageous in increasing the lever advantage by lengthening the lever arm. If the arm did not extend, there would actually be less leverage on the larger pipes and, in a manually operable machining tool, the turning pressure required could exceed the ability of the operator.

In order to take full advantage of the increased leverage, a plurality of auxiliary handles 39 are provided in equally spaced circumferential increments around the pipe. The tool here shown utilizes two frame arms 17 and two auxiliary arms 41 arranged at right angles thereto.

The auxiliary arms each consist of a tube 43 secured in one of a pair of parallel holes 44 formed in the hub 16, and a telescoping threaded rod 46 similar to the rods 27. A nut 47 is threaded on the rod 46 and is attached to the tube 43 so that twisting of the handle 39 will move it inwardly or outwardly. If desired, a quick release connection similar to the one in the end of arm 17 could be used at the end of tube 43.

FIGURES 2, 3 and 4 illustrate the adjustable pipe machining tool of the present invention as set up for use with a motor drive 51. This drive may consist of electrical or pneumatic motors driving an annular race 52, which may be connected by suitable bolts to the frame holes 44, the motor drive also having a control handle 53.

Such motors are widely available commercially and may be of the types commonly used for opening and closing large gate valves.

The motor driven units are often used to machine the ends of pipe in a limited space, such as in a trench where repairs are to be made to pipe already installed. In such cases, it is desirable that the screw adjusting handles extend no further outwardly than is absolutely necessary. Because the motor drive is powerful enough to machine all sizes of pipes, it is not necessary that the handles be extendable as the tool holders are moved outwardly.

Accordingly, the machining tool is modified, in the manner best seen in FIGURE 3 of the drawings, by providing the screw adjustment in the form of a threaded rod 61 which does not move axially in the arm 17.

To adapt the machining tool, the rod 27 is removed by loosening nut 26 (see FIGURE 5), and removing the clamping block 23. The element 34 is then pressed in to release the threaded engagement and rod 27 is withdrawn from the bore 32.

The block 23 is inverted, and a quick release device is positioned in an open chamber 62 in that block. This quick release device consists of a manually engageable element 63 having a bore 64 therethrough which is slightly larger than rod 61. A portion 66 of the bore 64 is threaded for engagement with the threads of rod 61, and a spring 67 is compressed in chamber 62. It should be noted that the spring here normally tends to press the threads out of engagement.

The rod 61 is then inserted through the bores 32 and 36. The rod 61 also passes through the bore 64 in element 63, and the inner end of the rod approaches the hub 16.

It will be noted that the outer end 60 of the rod 61 is enlarged to a diameter corresponding to the outside diameter of the rod 27 which it replaces. A peripheral groove 68 is formed in the end 60 in position to register with the element 34. The groove 68 is slightly wider than the element 34 so that the latter will snap into the groove and act as a keeper to prevent axial movement of the rod while permitting rotation thereof.

A handle 69 is provided on the end of rod 61 for twisting the rod and effecting fine screw adjustment of the tool holder when the element 63 is threadedly engaged with rod 61 by pressing the element toward arm 17.

A machine stop is provided in both forms of the machining tool so that the tool block 19 may be moved outwardly, as when being moved from one pipe to another, and then returned precisely to its original position. This stop is provided by a block 71 proportioned to slide in the slotted arm 17, and having a clamping member 72 attached thereto by a screw 73.

To set the stop, the block 71 is positioned against the inner face of tool block 19 and the screw 73 is tightened down to clamp the stop in place. The tool block may then be moved inwardly by loosening nut 26. When it is desired to reposition the tool block, it is moved back against the stop block 71 and the tool block clamping nut is tightened down.

I claim:

1. In a pipe machining tool having an arbor positionable in concentric relation to the end of a pipe and an outwardly extending arm mounted to revolve and advance along the arbor, a quick adjusting machining device comprising a tool block mounted for sliding movement along said arm and having a blade assembly thereon, a threaded rod journaled against endwise movement in said arm with its axis disposed so as to feed said blade assembly radially with respect to said arbor, a first quick release connection between said arm and said rod and a second quick release connection between said tool block and said rod for selectively providing fine screw adjustment of the block on the arm when engaged and permitting free movement of the block along the arm when disengaged.

2. In a pipe machining tool having an arbor positionable in concentric relation to the end of a pipe and an outwardly extending arm mounted to revolve and advance along the arbor, a quick adjusting machining device, comprising a tool block mounted for sliding movement along said arm and having a blade assembly thereon, a threaded rod journaled against endwise movement in said arm with its axis disposed so as to feed said blade assembly radially with respect to said arbor, a first quick release connection between said arm and said rod and a quick second release connection between said tool block and said rod for selectively providing fine screw adjustment of the block on the arm when engaged and permitting free movement of the block along the arm when disengaged, said second quick release connection having a manually engageable element formed with a bore slidable over a threaded radially extending rod and having a threaded portion selectively engageable with said rod so as to provide fine adjustment upon rotation of the rod with the threads engaged.

3. In a pipe machining tool having an arbor positionable in concentric relation to the end of a pipe and an outwardly extending arm mounted to revolve and advance along the arbor, a quick adjusting machining device, comprising a tool block mounted for sliding movement along said arm and having a blade assembly thereon, a threaded rod journaled against endwise movement in said arm with its axis disposed so as to feed said blade assembly radially with respect to said arbor, a first quick release connection between said arm and said rod and a second quick release connection between said tool block and said rod for selectively providing fine screw adjustment of the block on the arm when engaged and permitting free movement of the block along the arm when disengaged, said second quick release connection having a manually engageable element formed with a bore slidable over said rod and having a threaded portion selectively engageable with said rod so as to provide fine adjustment upon rotation of the rod with the threads engaged, and spring means bearing on said manually engageable element for normally holding the latter in a desired relation to said rod.

4. In a pipe machining tool having an arbor positionable in concentric relation to the end of a pipe and an outwardly extending arm mounted to revolve and advance along the arbor, a quick adjusting machining device comprising a tool block mounted for sliding movement along said arm and having a blade assembly thereon, a threaded rod journaled against endwise movement in said arm with its axis disposed so as to feed said blade assembly radially with respect to said arbor, a first quick release connection between said arm and said rod and a second quick release connection between said tool block and said rod for selectively providing fine screw adjustment of the block on the arm when engaged and permitting free movement of the block along the arm when disengaged, said second quick release connection having a manually engageable element formed with a bore slidable over said rod and having a threaded portion selectively engageable with said rod so as to provide fine adjustment upon rotation of the rod with the threads engaged, and spring means bearing on said manually engageable element for normally holding the latter in a desired relation to said rod, said spring means being biased to urge said threaded portion of the manually engageable element out of engagement with the threaded rod, and locking means for releasably clamping said tool block in adjusted position.

5. In a pipe machining tool of the character described, a tool supporting frame, comprising a hub adapted for mounting on an arbor for axial and rotative movement, a tool block, an arm extending outwardly from said hub and formed for supporting said tool block for sliding movement along the arm, said arm being formed with a bore for receiving a threaded rod, a first quick release means on said arm formed for selective engagement with said rod, and a second quick release means connected to said tool block and adapted for selective engagement with a threaded rod positioned in said bore.

6. A pipe machining tool as described in claim 5, wherein said first quick release means comprises an open chamber formed in said arm and intersecting said bore, a manually engageable element mounted for reciprocation in said chamber and being formed with an opening therethrough larger than and alignable with said bore, said opening having a portion formed with threads corresponding to the threaded rod, and spring means biased to urge said threaded portion against a rod positioned in said bore, and said second quick release means comprises a clamping block connected to said tool block, said clamping block being formed with an open chamber and an intersecting bore adapted for receiving a threaded rod, a manually engageable element mounted for reciprocation in said chamber and being formed with an opening therethrough larger than and alignable with said bore, said opening having a portion formed with threads corresponding to the threaded rod, and spring means compressed in said chamber and normally urging said element in a desired direction against said rod.

7. A pipe machining tool as described in claim 6, wherein each of said first and second quick release means is adapted for conversion from threaded engagement with said threaded rod to journaled engagement with said rod in which the quick release means is journaled against axial movement with respect to said rod, and wherein first and second threaded rods are provided, said first rod being adapted for journaled engagement with said first quick release means and screw engagement with the threads of said second quick release means, and said second rod being adapted for screw engagement with the threads of said first quick release means and journaled engagement with said second quick release means, whereby one of said rods may be quickly released from engagement with said arm and said tool block and withdrawn from said arm and replaced therein by the other of said rods, so that the tool may thereby be interchangeably and readily converted from one in which the rod moves axially of the arm and the tool block remains axially fixed of the rod, to one in which the rod remains axially fixed of the arm and the tool block moves axially of the rod.

References Cited by the Examiner
UNITED STATES PATENTS

| | | | |
|---|---|---|---|
| 924,122 | 6/1909 | Williams | 100—289 |
| 1,674,372 | 6/1928 | Nonneman. | |
| 1,841,550 | 9/1930 | Parker. | |
| 1,860,846 | 5/1932 | Watt | 144—205 |
| 1,993,561 | 3/1935 | Meglitz. | |
| 2,537,916 | 1/1951 | Rosenboom | 144—205 |
| 2,607,376 | 8/1952 | Montgomery | 144—205 |
| 2,746,497 | 5/1956 | Thompson | 144—205 |
| 2,861,608 | 11/1958 | Brown | 144—205 |

WILLIAM W. DYER, JR., *Primary Examiner.*

HARRISON L. HINSON, *Examiner.*